(12) United States Patent
Li et al.

(10) Patent No.: US 6,693,812 B1
(45) Date of Patent: Feb. 17, 2004

(54) BIAS SUPPLY SELECTION CIRCUIT, METHOD OF OPERATION THEREOF AND POWER SUPPLY EMPLOYING THE SAME

(75) Inventors: Li Li, Dallas, TX (US); John F. Steel, Plano, TX (US); Thomas G. Wang, Plano, TX (US)

(73) Assignee: Tyco Electronics Power Systems Inc., Mesquite, TX (US)

( * ) Notice: Subject to any disclaimer, the term of this patent is extended or adjusted under 35 U.S.C. 154(b) by 0 days.

(21) Appl. No.: 10/217,011

(22) Filed: Aug. 12, 2002

(51) Int. Cl.[7] ............................................. H02M 3/335
(52) U.S. Cl. ........................................................ 363/97
(58) Field of Search ............................. 363/95, 97, 131, 363/21.01; 323/273, 280

(56) References Cited

U.S. PATENT DOCUMENTS

| | | | |
|---|---|---|---|
| 4,935,858 A | * 6/1990 | Panicali | 363/21.01 |
| 5,455,503 A | * 10/1995 | Kohler | 323/273 |
| 6,078,509 A | * 6/2000 | Jacobs et al. | 363/21.18 |

\* cited by examiner

Primary Examiner—Adolf D. Berhane

(57) ABSTRACT

The present invention provides a bias supply selection circuit employable with a linear regulating device configured to provide a first bias supply voltage and a main bias supply stage configured to provide a second bias supply voltage. In one embodiment, the bias supply selection circuit includes a voltage monitoring circuit configured to monitor a level of the second bias supply voltage and to provide a control voltage proportional to the level. Additionally, the bias supply selection circuit includes a controllable switching circuit, coupled to the voltage monitoring circuit, configured to select the second bias supply voltage by deactivating the linear regulating device when the control voltage reaches a predetermined value.

21 Claims, 3 Drawing Sheets

BIAS SUPPLY SELECTION CIRCUIT, METHOD OF OPERATION THEREOF AND POWER SUPPLY EMPLOYING THE SAME

TECHNICAL FIELD OF THE INVENTION

The present invention is directed, in general, to power electronics and, more specifically, to a bias supply selection circuit, a method of operating a bias supply and a switching power supply employing the same.

BACKGROUND OF THE INVENTION

The electronics industry continues to develop smaller equipment that performs many functions, which in turn may require increasingly more power from smaller, more compact power supplies. Additionally, such power supplies may have internal bias supply requirements for additional voltages that are different from the main power supply voltages. Bias supplies are used in power supplies to provide operating voltages needed by internal power control circuits or other circuits that provide proper operation during start-up or sustained power supply operation. The voltage and power requirements typically satisfied by bias supplies add another level of complexity to an already demanding environment.

Presently, there are several options for deriving a bias supply voltage such as that needed for control circuits that may be used in a small power supply unit. Typically, bias supply voltages are of approximately 12 volts with acceptable tolerances in the neighborhood of ten percent. Staying within this tolerance range requires more than an unregulated approach, especially when an input voltage to the power supply varies outside of its typical range.

The operating and safety demands of power supplies also add to the existing level of complexity. For example, a power supply should reliably ramp up under a start-up condition such as power-on. Additionally, the power supply typically should provide the ability to sustain a fault condition, such as a lower-than-rated impedance across its output. This is normally accomplished by limiting the output load current at an output voltage that is maintained near zero volts. This low output voltage fault condition may disrupt the switching bias supply associated with the power supply thereby impeding fault recovery when the fault is cleared.

One way of generating a bias voltage is to use separate magnetics to develop the bias voltage from an independent switching bias supply. This approach is, of course, usually more costly. Another approach uses a voltage developed in a winding coupled to an output inductor. This voltage may then be regulated further with a dissipative regulator. This particular approach suffers from the need to adequately isolate conductors on the primary and secondary sides of a boundary of a power transformer. Another common approach uses a linear regulating device, coupled to a source of input voltage of the power supply, to generate a bias supply voltage. Although this arrangement is reliable and predictable, linear regulating devices are usually highly dissipative regulators and when improperly controlled (e.g., controlled to be continually conducting) can reduce the overall efficiency of the power supply.

Accordingly, what is needed in the art is a way to provide a bias supply voltage that is predictable under, for instance, power supply start-up conditions or fault conditions and also provides improved overall efficiency.

SUMMARY OF THE INVENTION

To address the above-discussed deficiencies of the prior art, the present invention provides a bias supply selection circuit employable with a linear regulating device configured to provide a first bias supply voltage and a main bias supply stage configured to provide a second bias supply voltage. In one embodiment, the bias supply selection circuit includes a voltage monitoring circuit configured to monitor a level of the second bias supply voltage and to provide a control voltage proportional to the level. Additionally, the bias supply selection circuit includes a controllable switching circuit coupled to the voltage monitoring circuit and configured to select the second bias supply voltage by deactivating the linear regulating device when the control voltage reaches a predetermined value.

In another aspect, the present invention provides a method of operating a bias supply for use with a linear regulating device that provides a first bias supply voltage and a main bias supply stage that provides a second bias supply voltage. The method includes monitoring a level of the second bias supply voltage and providing a control voltage proportional to the level. The method also includes selecting the second bias supply voltage by deactivating the linear regulating device when the control voltage reaches a predetermined value.

The present invention also provides, in yet another aspect, a switching power supply including a primary power supply circuit having a main switch and coupled to a transformer. The switching power supply also employs a secondary power supply and bias supply circuit coupled to the transformer. The bias supply circuit employs a linear regulating device that provides a first bias supply voltage and a main bias supply stage that provides a second bias supply voltage. Additionally, the switching power supply also employs a bias supply selection circuit coupled to the bias supply circuit having a voltage monitoring circuit that monitors a level of the second bias supply voltage and provides a control voltage proportional to the level. The bias supply selection circuit also has a controllable switching circuit, coupled to the voltage monitoring circuit, that selects the second bias supply voltage by deactivating the linear regulating device when the control voltage reaches a predetermined value.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
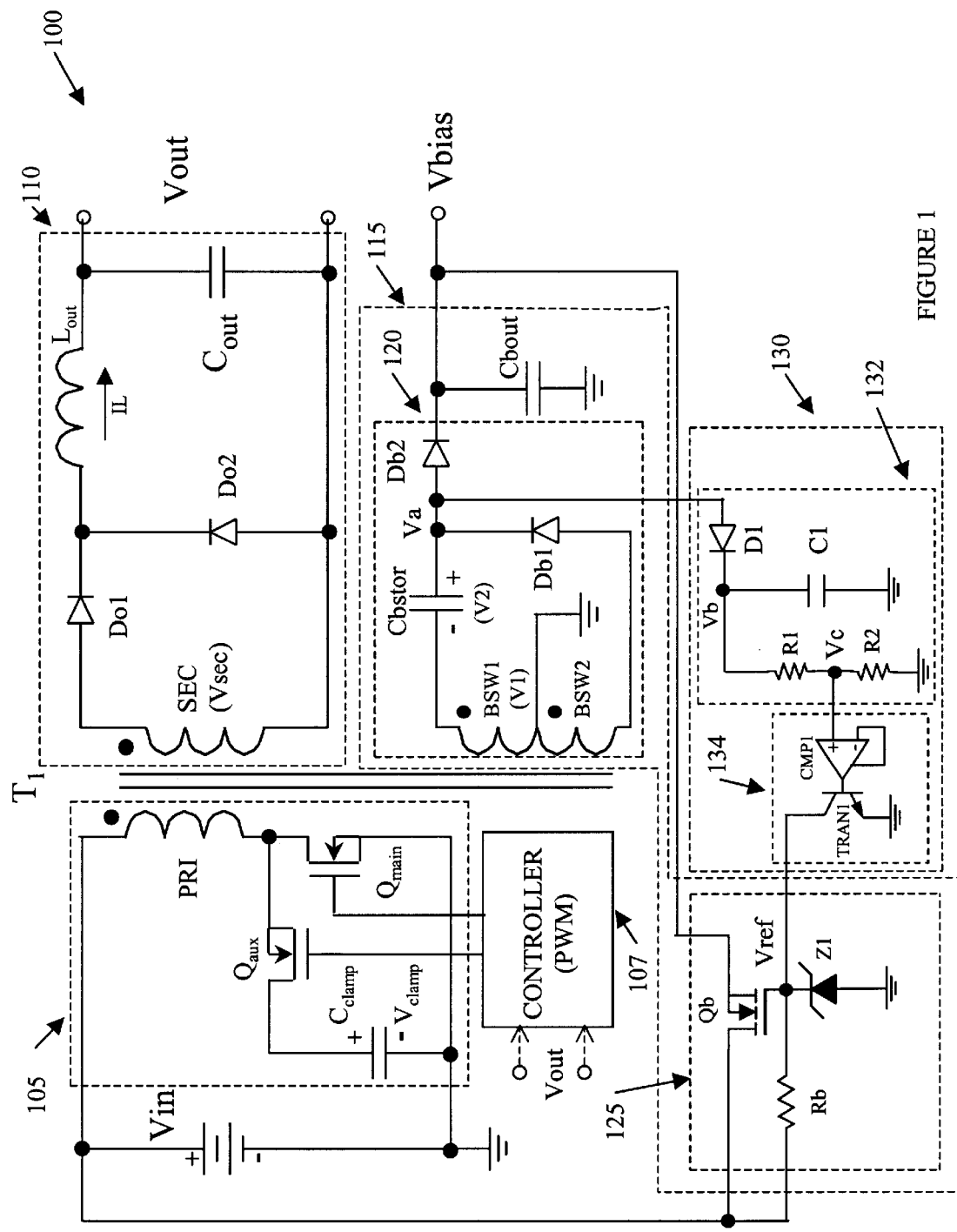
FIG. 1 illustrates a schematic diagram of an embodiment of a switching power supply constructed in accordance with the principles of the present invention.

Referring initially to FIG. 1, illustrated is a schematic diagram of an embodiment of a switching power supply, generally designated 100, constructed in accordance with the principles of the present invention. The switching power supply 100 includes a primary power supply circuit 105 driven by a power supply controller 107, a secondary power supply circuit 110 and a bias supply circuit 115 having a main bias supply stage 120 and an auxiliary bias supply stage 125 jointly coupled to a bias voltage output capacitor Cbout. The switching power supply 100 also includes of a bias supply selection circuit 130 having a voltage monitoring circuit 132 and a controllable switching circuit 134.

The primary power supply circuit 105 is coupled to a source of input voltage Vin and includes a primary winding PR1 of a transformer T1, a main switch Qmain and an auxiliary switch Qaux that is series-coupled to a clamp capacitor Cclamp having a clamp voltage Vclamp across it. In the illustrated embodiment, the auxiliary switch Qaux and the clamp capacitor Cclamp form an active clamp transformer reset circuit.

For the transformer winding senses shown in FIG. 1, the primary power supply circuit 105 transfers power forward from the primary winding PRI to the secondary winding SEC during conduction of the main switch Qmain thereby providing a forward portion of an overall switching cycle. The main switch Qmain connects the input voltage Vin across the primary winding PRI for a main conduction period. At the conclusion of the main conduction period, the primary winding PRI is coupled across a difference between the input voltage Vin and the clamp voltage Vclamp across the clamp capacitor Cclamp.

This action is accomplished by the auxiliary switch Qaux, which conducts for an auxiliary conduction period. The auxiliary conduction period represents a transformer reset portion of the overall switching cycle that is substantially mutually exclusive of the main conduction period. Of course, one skilled in the pertinent art realizes that there may be a small overlap in the main and auxiliary conduction periods due to associated transition times or switching delays. The clamp capacitor Cclamp allows the magnetic flux through the core of the transformer T1 to be substantially reset to a predetermined value at the beginning of the main conduction period. Both the main conduction period and the auxiliary conduction period are controlled by the power supply controller 107. For additional information concerning the operation of main and auxiliary switches see U.S. Pat. No. Re. 36,571, entitled "Low loss synchronous rectifier for application to clamped-mode power converters," issued Feb. 15, 2000, to Rozman, which is incorporated herein by reference.

The secondary power supply circuit 110 provides an output voltage Vout and includes a secondary winding SEC of the transformer T1, first and second output diodes Do1, Do2, an output inductor Lout and an output capacitor Cout. For the transformer winding senses shown in FIG. 1, the secondary power supply circuit 110 couples a secondary voltage Vsec, associated with the secondary winding SEC, to the first output diode Do1 during the main conduction period.

The secondary voltage Vsec is coupled through the first output diode Do1 to the output inductor Lout. Then, during the auxiliary conduction period, the output inductor current $I_L$ flows through the second output diode Do2. A major portion of the output inductor current $I_L$ flows through a load (not shown) connected to an output of the power supply 100.

An AC portion of the output inductor current $I_L$ flows through the output capacitor Cout, which provides a filtering function for the output voltage Vout.

The bias supply circuit 115 is coupled to the source of input voltage Vin and the transformer T1 and provides a bias supply voltage Vbias. The auxiliary bias supply stage 125 provides the bias supply voltage Vbias (a first or non-steady state bias supply voltage) during a non-steady state period of operation of the power supply 100. Alternatively, the main bias supply stage 120 provides the bias supply voltage Vbias (a second or steady state bias supply voltage) during a steady state period of operation of the power supply 100. A steady state period of operation may be defined as one in which the output voltage Vout is being regulated by the power supply controller 107 and is approximately equal to its rated value. A non-steady state period of operation may be defined as one in which the power supply controller 107 is unable to appropriately regulate the output voltage Vout. A non-steady state power supply condition typically occurs during a power-on or fault-recovery situation when the output voltage Vout is substantially less than its rated value.

The main bias supply stage 120 includes first and second bias supply windings BSW1, BSW2 associated with the transformer T1, a bias supply storage capacitor Cbstor and first and second bias supply diodes Db1, Db2. As a general condition, the first bias supply winding BSW1 is configured to provide a first voltage V1 that is dependent on at least one of the input voltage Vin and the clamp voltage Vclamp during either the main conduction period or the auxiliary conduction period.

Additionally the bias supply storage capacitor Cbstor, which is coupled to the second bias supply winding BSW2 through the first bias supply diode Db1, is configured to provide a second voltage V2 that is dependent on at least the other of the input voltage Vin and the clamp voltage Vclamp during the other of the main conduction period or the auxiliary conduction period. In this embodiment, wherein the first voltage V1 is dependent only on the first bias supply winding BSW1, the second voltage V2 is dependent on both the first bias supply winding BSW1 and the second bias supply winding BSW2. A sum of the first voltage V1 and the second voltage V2 then provides the bias supply voltage Vbias during a steady state period of operation of the power supply 100.

For the transformer winding senses shown in the embodiment of FIG. 1, the first bias supply winding BSW1 provides the first voltage V1 in a manner that is dependent substantially only on the input voltage Vin during the main conduction period. During the auxiliary conduction period, the second bias supply winding BSW2 together with the first bias supply winding BSW1 provides the second voltage V2 in a manner that is dependent on a difference between the input voltage Vin and the clamp voltage Vclamp during the auxiliary conduction period. The second voltage V2 is stored on the bias supply storage capacitor Cbstor. The first and second voltages V1, V2 are effectively summed and coupled to the bias voltage output capacitor Cbout through the second bias supply diode Db2 during the main conduction period.

In an alternative embodiment, the voltage sense of the first and second bias supply windings BSW1, BSW2 may be reversed from the one shown in FIG. 1 (i.e., voltage sense dots at the bottom of each winding). The first bias supply winding BSW1 then provides the first voltage V1 in a manner that is dependent on the difference between the input voltage Vin and the clamp voltage Vclamp during the auxiliary conduction period. For this alternative arrangement, the bias supply storage capacitor Cbstor then provides the second voltage V2 in a manner that is substantially dependent only on the input voltage Vin during the main conduction period.

The auxiliary bias supply stage 125 includes a linear regulating device Qb, a bias resistor Rb and a zener diode Z1. As shown in FIG. 1, the bias resistor Rb and the linear regulating device Qb (e.g., a transistor) are coupled to the source of the input voltage Vin. The zener diode Z1 is coupled to the bias resistor Rb and forms a reference voltage Vref for the linear regulating device Qb, which operates in a source-follower mode. Of course, one skilled in the art will recognize that other types of linear regulating devices or circuits may be employed and are well within the scope of the present invention. During a non-steady state period of operation, such as power supply start-up, the linear regulating device Qb provides the bias supply voltage Vbias that is slightly less than the reference voltage Vref.

As the power supply 100 powers ON or recovers from an output fault condition, the auxiliary bias supply stage 125 provides the bias supply voltage Vbias in order to power to various bias circuits. This action persists until a voltage from the main bias supply stage 120 has substantially reached the rated value associated with the power supply 100. At this point, the bias supply selection circuit 130 deactivates the linear regulating device Qb thereby allowing the main bias supply stage 120 to provide sole control of the bias supply voltage Vbias.

The bias supply selection circuit 130 is coupled to the bias supply circuit 115 and includes the voltage monitoring circuit 132 and the controllable switching circuit 132, as noted earlier. The voltage monitoring circuit 134 includes a diode D1, a capacitor C1 and a voltage divider formed by first and second divider resistors R1, R2. The controllable switching circuit 134 includes a comparator CMP1 having an internal reference that is coupled to a transistor TRAN1. The diode D1 is coupled to a node proximate a main bias supply internal voltage Va provided by the main bias supply stage 120 and provides a monitoring voltage Vb that mirrors the main bias supply internal voltage Va. The capacitor C1 provides some smoothing for the monitoring voltage Vb and the junction of the first and second divider resistors R1, R2 provides a control voltage Vc proportional to the monitoring voltage Vb.

For a start-up (i.e., non-steady state) condition of the power supply 100, the main bias supply internal voltage Va increases from a value that is less than a steady state of the bias supply voltage Vbias. When the main bias supply internal voltage Va and therefore the monitoring voltage Vb are substantially equal to the steady state value of the bias supply voltage Vbias, the control voltage Vc reaches a predetermined level that causes the comparator CMP1 to trigger thereby allowing the transistor TRAN1 to conduct. The predetermined level may result from a steady state value of the bias supply voltage Vbias that is greater than, equal to or less than the non-steady state value of the bias supply voltage Vbias as determined by the relative values of the first and second divider resistors R1, R2. As the transistor TRAN1 conducts it places a substantial short across the zener diode Z1 thereby deactivating the linear regulating device Qb and effectively isolating the auxiliary bias supply stage 125.

Figure 2:
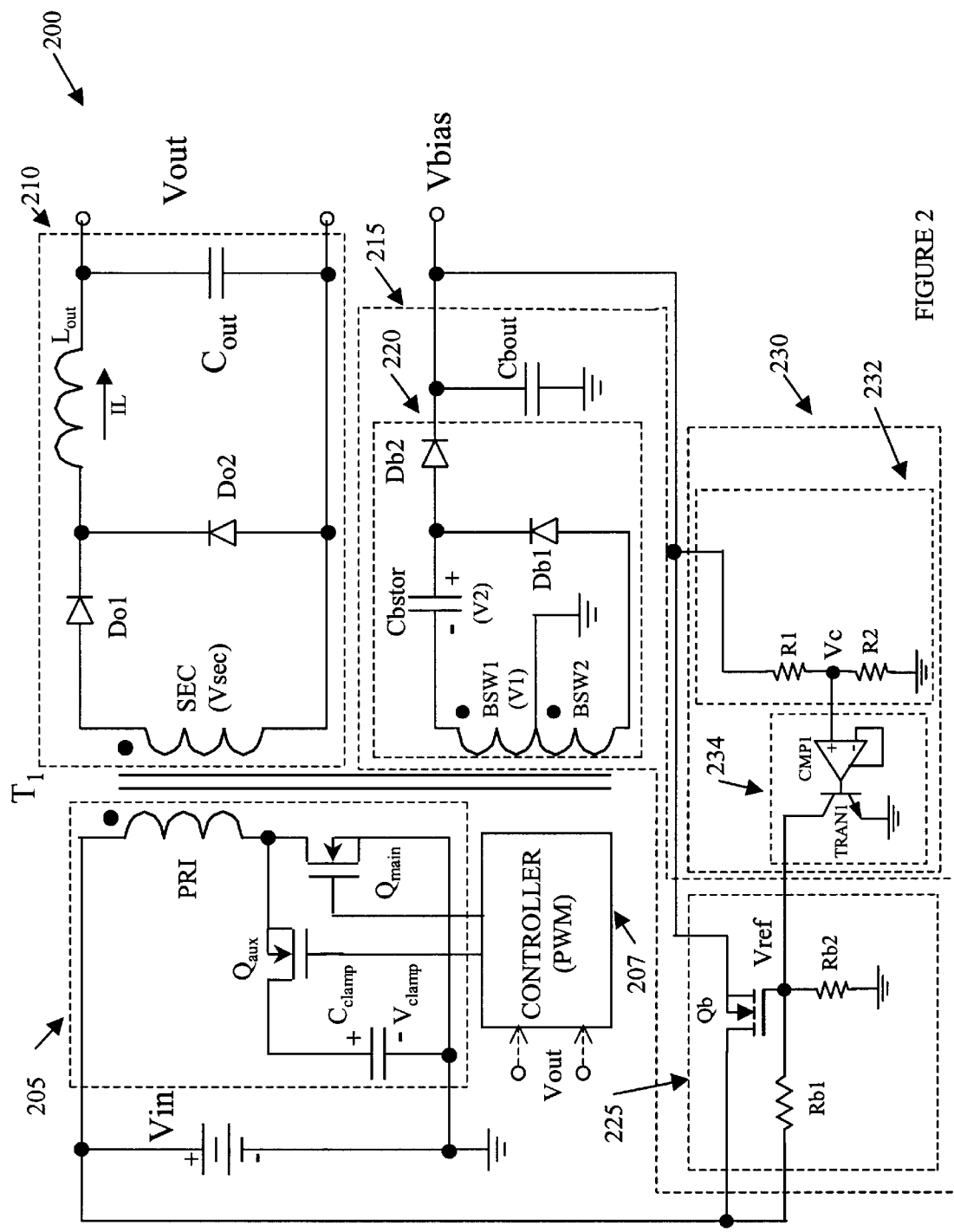
FIG. 2 illustrates a schematic diagram of an embodiment of a switching power supply employing an alternative embodiment of a bias supply selection circuit constructed in accordance with the principles of the present invention.

Turning now to FIG. 2, illustrated is a schematic diagram of an embodiment of a switching power supply, generally designated 200, employing an alternative embodiment of a bias supply selection circuit 230 constructed in accordance with the principles of the present invention. The switching power supply 200 includes a primary power supply circuit 205 driven by a power supply controller 207, a secondary power supply circuit 210 and a bias supply circuit 215 having a main bias supply stage 220 and an auxiliary bias supply stage 225 jointly coupled to a bias voltage output capacitor Cbout. The bias supply selection circuit 230 is coupled to the bias supply circuit 215 and includes a voltage monitoring circuit 232 and a controllable switching circuit 234.

The operation of the primary power supply circuit 205, the secondary power supply circuit 210 and the main bias supply stage 220 are substantially equivalent to the operation of analogous circuits described with respect to the power supply 100 of FIG. 1. A bias supply voltage Vbias is provided across the bias voltage output capacitor Cbout by the bias supply circuit 215. In the illustrated embodiment, the auxiliary bias supply stage 225 includes first and second bias resistors Rb1, Rb2 and a linear regulating device Qb. Initially, during a non-steady state period of operation of the power supply 200, the linear regulating device Qb provides the bias supply voltage Vbias (a first or non-steady state bias supply voltage).

As shown in FIG. 2, the first bias resistor Rb1 and the linear regulating device Qb are coupled to a source of input voltage Vin. The second bias resistor Rb2 is coupled to the first bias resistor Rb1 and forms a reference voltage Vref at their junction for the linear regulating device Qb, which again operates in a source-follower mode. As before, one skilled in the art will recognize that other types of linear regulating devices or circuits may be employed and are well within the broad scope of the present invention.

In the illustrated embodiment, the voltage monitoring circuit 232 includes a voltage divider formed by first and second divider resistors R1, R2. The controllable switching circuit 234 is coupled to the voltage monitoring circuit 232 and includes a comparator CMP1 having an internal reference that is coupled to a transistor TRAN1, as discussed with respect to FIG. 1. The first divider resistor R1 is coupled directly to the bias supply voltage Vbias. The junction of the first and second divider resistors R1, R2 provides a control voltage Vc proportional to the value of the bias supply voltage Vbias.

For a non-steady state operating condition of the power supply 200, the auxiliary bias supply stage 225 provides the bias supply voltage Vbias (first or non-steady state bias supply voltage) until such time a voltage from the main bias supply stage 220 reaches its steady state value. When the voltage from the main bias supply stage 220 is slightly greater than the bias supply voltage Vbias provided by the auxiliary bias supply stage 225, the control voltage Vc reaches a predetermined level that causes the comparator CMP1 to trigger thereby causing the transistor TRAN1 to conduct. This action places a substantial short across the second bias resistor Rb2 thereby deactivating the linear regulating device Qb and effectively isolating the auxiliary bias supply stage 225. This also indicates that the power supply 200 has entered a steady state period of operation thereby allowing the main bias supply stage 220 to provide the bias supply voltage Vbias.

Figure 3:
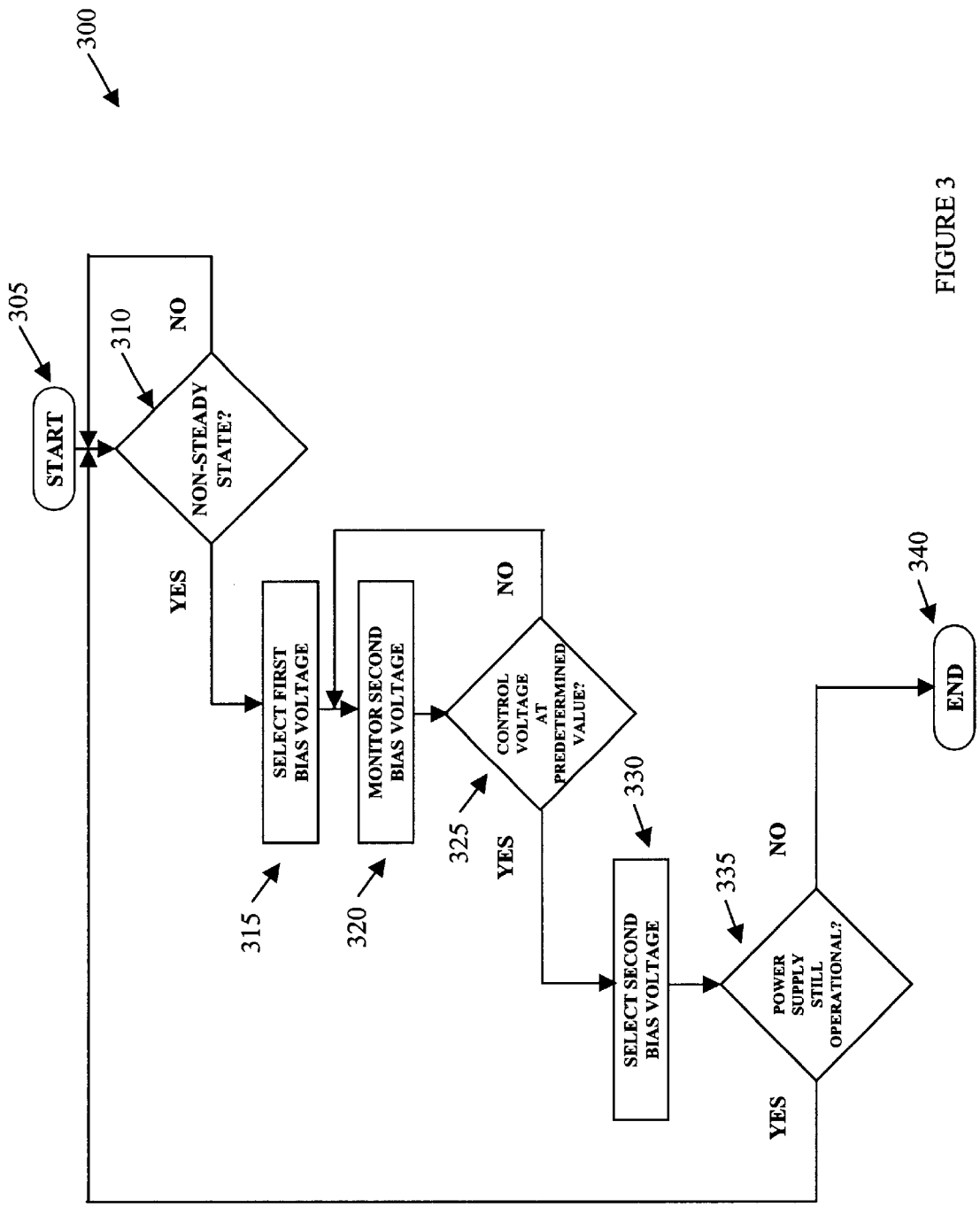
FIG. 3 illustrates a flow diagram of a method of operating a bias supply constructed in accordance with the principles of the present invention.

Turning now to FIG. 3, illustrated is a flow diagram of a method of operating a bias supply, generally designated 300, constructed in accordance with the principles of the present invention. The method 300 is employable with a linear regulating device that provides a first or non-steady state bias supply voltage and a main bias supply stage that provides a second or steady state bias supply voltage. The method 300 starts in a step 305 with an ability to supply the first bias supply voltage during a non-steady state period of operation of the power supply. In a first decision step 310, a determination is made as to whether the power supply is operating in a non-steady state mode of operation. If a steady state mode of operation exists, the method 300 returns to the first decision step 310 and continues in a loop until it is determined that a non-steady state mode of operation exists.

Determination that a non-steady state mode of operation exists in the first decision step 310 allows the method 300 to progress to a step 315 wherein the first bias supply voltage is selected as a bias supply voltage. A level of the second bias supply voltage is monitored to provide a control voltage proportional to the second bias supply voltage in a step 320. Then in a second decision step 325, a decision is made as to whether the level of the control voltage has reached a predetermined level. If not, the method 300 returns to the step 320. If the control voltage has achieved the predetermined level thereby indicating that the second bias supply voltage has reached a level that supports the required bias supply voltage, the method 300 moves to a step 330 wherein the second bias supply voltage is selected.

In a third decision step 335, it is determined whether the power supply is still operational. If the power supply is operational, the method 300 returns to the first decision step 310 awaiting the next non-steady state operating condition. If the power supply is determined not to be operational in the third decision step 335, the method 300 ends in a step 340.

In summary, embodiments of the present invention employing a bias supply selection circuit and a method of operating a bias supply associated with a switching power supply have been presented. The bias supply selection circuit selects a first bias supply voltage provided by a linear regulating device during a non-steady state period of operation thereby providing a bias supply voltage during, for instance, a power-up or fault recovery power supply situation. This allows the switching power supply to obtain a steady state condition which employs a switching regulated main bias supply stage to provide the needed bias supply voltage. The bias supply selection circuit then deactivates the linear regulating device thereby improving the overall efficiency of the power supply.

Although the present invention has been described in detail, those skilled in the art should understand that they can make various changes, substitutions and alterations herein without departing from the spirit and scope of the invention in its broadest form.

What is claimed is:

1. A bias supply selection circuit employable with a linear regulating device configured to provide a first bias supply voltage and a main bias supply stage configured to provide a second bias supply voltage, comprising:
   a voltage monitoring circuit configured to monitor a level of said second bias supply voltage and to provide a control voltage proportional to said level; and
   a controllable switching circuit, coupled to said voltage monitoring circuit, configured to select said second bias supply voltage by deactivating said linear regulating device when said control voltage reaches a predetermined value.

2. The bias supply selection circuit as recite in claim 1 wherein said linear regulating device forms a portion of an auxiliary bias supply stage.

3. The bias supply selection circuit as recite in claim 1 wherein said voltage monitoring circuit comprises a capacitor coupled to a voltage divider.

4. The bias supply selection circuit as recite in claim 1 wherein said voltage monitoring circuit comprises a diode.

5. The bias supply selection circuit as recite in claim 1 wherein said controllable switching circuit comprises a comparator coupled to a transistor.

6. The bias supply selection circuit as recite in claim 1 wherein said linear regulating device is configured to initially provide said first bias supply voltage.

7. The bias supply selection circuit as recite in claim 1 wherein said controllable switching circuit is configured to select said second bias supply voltage by deactivating said linear regulating device when said control voltage indicates that said level of said second bias supply voltage equals a level of said first bias supply voltage.

8. A method of operating a bias supply for use with a linear regulating device that provides a first bias supply voltage and a main bias supply stage that provides a second bias supply voltage, comprising:
   monitoring a level of said second bias supply voltage;
   providing a control voltage proportional to said level; and
   selecting said second bias supply voltage by deactivating said linear regulating device when said control voltage reaches a predetermined value.

9. The method as recite in claim 8 wherein said linear regulating device forms a portion of an auxiliary bias supply stage.

10. The method as recite in claim 8 wherein said monitoring employs a capacitor coupled to a voltage divider.

11. The method as recite in claim 8 wherein said monitoring employs a diode.

12. The method as recite in claim 8 wherein said selecting employs a comparator coupled to a transistor.

13. The method as recite in claim 8 wherein prior to said monitoring said linear regulating device initially provides said first bias supply voltage.

14. The method as recite in claim 8 wherein said selecting selects said second bias supply voltage by deactivating said linear regulating device when said control voltage indicates that said level of said second bias supply voltage equals a level of said first bias supply voltage.

15. A switching power supply, comprising:
   a primary power supply circuit having a main switch and coupled to a transformer;
   a secondary power supply circuit coupled to said transformer;
   a bias supply circuit, coupled to said transformer, that employs a linear regulating device to provide a first bias supply voltage and a main bias supply stage to provide a second bias supply voltage; and
   a bias supply selection circuit coupled to said bias supply circuit, including:
      a voltage monitoring circuit that monitors a level of said second bias supply voltage and provides a control voltage proportional to said level; and
      a controllable switching circuit, coupled to said voltage monitoring circuit, that selects said second bias supply voltage by deactivating said linear regulating device when said control voltage reaches a predetermined value.

16. The switching power supply as recite in claim 15 wherein said linear regulating device forms a portion of an auxiliary bias supply stage.

17. The switching power supply as recite in claim 15 wherein said voltage monitoring circuit comprises a capacitor coupled to a voltage divider.

18. The switching power supply as recite in claim 15 wherein said voltage monitoring circuit comprises a diode.

19. The switching power supply as recite in claim 15 wherein said controllable switching circuit comprises a comparator coupled to a transistor.

20. The switching power supply as recite in claim 15 wherein said linear regulating device initially provides said first bias supply voltage.

21. The switching power supply as recite in claim 15 wherein said controllable switching circuit selects said second bias supply voltage by deactivating said linear regulating device when said control voltage indicates that said level of said second bias supply voltage equals a level of said first bias supply voltage.

\* \* \* \* \*